(12) United States Patent
Lu et al.

(10) Patent No.: US 11,593,115 B2
(45) Date of Patent: Feb. 28, 2023

(54) PROCESSOR, DEVICE, AND METHOD FOR EXECUTING INSTRUCTIONS

(71) Applicant: ALIBABA GROUP HOLDING LIMITED, Grand Cayman (KY)

(72) Inventors: Yimin Lu, Hangzhou (CN); Xiaoyan Xiang, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 67 days.

(21) Appl. No.: 16/826,146

(22) Filed: Mar. 20, 2020

(65) Prior Publication Data

US 2020/0310816 A1    Oct. 1, 2020

(30) Foreign Application Priority Data

Mar. 27, 2019   (CN) .......................... 201910238787.8

(51) Int. Cl.
*G06F 9/38* (2018.01)
*G06F 9/30* (2018.01)

(52) U.S. Cl.
CPC ........ *G06F 9/3838* (2013.01); *G06F 9/30043* (2013.01)

(58) Field of Classification Search
CPC .................................................. G06F 9/3838
See application file for complete search history.

(56) References Cited

U.S. PATENT DOCUMENTS

| | | | |
|---|---|---|---|
| 5,168,560 | A | 12/1992 | Robinson et al. |
| 5,367,650 | A | 11/1994 | Sharangpani et al. |
| 5,475,855 | A | 12/1995 | Uesugi |
| 6,470,444 | B1 | 10/2002 | Sheaffer |

(Continued)

FOREIGN PATENT DOCUMENTS

WO    WO 2013/188696 A2    12/2013

OTHER PUBLICATIONS

PCT International Search Report and Written Opinion dated Jun. 12, 2020, issued in corresponding International Application No. PCT/US2020/023774 (17 pgs.).

(Continued)

*Primary Examiner* — Michael J Metzger
(74) *Attorney, Agent, or Firm* — Finnegan, Henderson, Farabow, Garrett & Dunner, LLP (57) ABSTRACT

The present disclosure discloses an instruction execution device, a processor including the instruction execution device, a system on chip, and a method for executing a data storage instruction in the processor. The method includes: splitting the data storage instruction into a first split instruction and a second split instruction, wherein the first split instruction is associated with an address operand of the data storage instruction, and the second split instruction is associated with a data operand of the data storage instruction; executing the first split instruction to determine a data storage address corresponding to the address operand; executing the second split instruction to acquire data content corresponding to the data operand; and storing the acquired data content to the determined data storage address in a data storage region. The present disclosure further discloses a corresponding instruction execution device, a processor including the execution device and a system on chip.

19 Claims, 4 Drawing Sheets

(56) References Cited

U.S. PATENT DOCUMENTS

| | | | |
|---|---|---|---|
| 7,434,031 B1* | 10/2008 | Spracklen | G06F 9/3826 |
| | | | 712/217 |
| 2015/0134934 A1* | 5/2015 | Abdallah | G06F 9/3836 |
| | | | 712/215 |
| 2017/0017490 A1 | 1/2017 | Caulfield | |
| 2017/0293567 A1* | 10/2017 | Bryant | G06F 12/0831 |
| 2018/0095752 A1* | 4/2018 | Kudaravalli | G06F 9/382 |
| 2018/0095761 A1* | 4/2018 | Winkel | G06F 9/30043 |

OTHER PUBLICATIONS

European Patent Office Communication issued for Application No. 20776801.1 which encloses the extended European Search Report which includes pursuant to Rule 62 EPC, the Supplementary European Search Report (EPC) and the European search opinion, dated Apr. 19, 2022, 11 pages.

* cited by examiner

PROCESSOR, DEVICE, AND METHOD FOR EXECUTING INSTRUCTIONS

CROSS REFERENCE TO RELATED APPLICATION

This disclosure claims the benefits of priority to Chinese application number is 201910238787.8, filed Mar. 27, 2019, which is incorporated herein by reference in its entirety.

BACKGROUND

The basic work of a processor includes executing a sequence of stored instructions, e.g., a program. Program execution includes a process of continuously fetching instructions, parsing instructions, and executing instructions. For example, the process may include fetching an instruction from a memory storing the program, decoding and executing the instruction, saving a result of the instruction execution, and cycling back and forth until a halt instruction is encountered. The processor may execute instructions in a pipelining manner. But pipelining conflicts may arise during execution of instructions in a pipelining manner, affecting the processor performance.

SUMMARY OF THE DISCLOSURE

The present disclosure provides a processor and an instruction execution method to solve or at least alleviate at least one of the problems discussed herein.

The present disclosure provides a method for executing a data storage instruction in a processor, including: splitting the data storage instruction into a first split instruction and a second split instruction, wherein the first split instruction is associated with an address operand of the data storage instruction, and the second split instruction is associated with a data operand of the data storage instruction; executing the first split instruction to determine a data storage address corresponding to the address operand; executing the second split instruction to acquire data content corresponding to the data operand; and storing the acquired data content to the determined data storage address in a data storage region.

In some embodiments, the method further includes: after determining the data storage address, storing the first split instruction and the data storage address; and after acquiring the data content, correlating the acquired data content and the stored data storage address according to a correspondence between the first split instruction and the second split instruction, so as to store the acquired data content to the determined data storage address.

In some embodiments, the method further includes: storing the first split instruction and a data loading instruction in a first issue queue (e.g., a loading/storing issue queue); and storing the second split instruction in a second issue queue (e.g., a storing issue subqueue) different from the first issue queue; wherein executing the first split instruction to determine the data storage address includes: issuing the first split instruction from the first issue queue, and wherein executing the second split instruction to acquire the data content includes: issuing the second split instruction from the second issue queue (e.g., the storing issue subqueue).

In some embodiments, the method further includes acquiring the data storage instruction and decoding the data storage instruction to determine the data operand and the address operand in the data storage instruction.

In some embodiments, the data content includes any one or more of: a register value, an operation result of an arithmetic unit, or data from the data storage region.

According to some embodiments of the present disclosure, there is provided an instruction execution device, including: an instruction splitting unit including circuitry configured to split a data storage instruction into a first split instruction and a second split instruction, wherein the first split instruction is associated with an address operand of the data storage instruction, and the second split instruction is associated with a data operand of the data storage instruction; an instruction address generation unit including circuitry configured to execute the first split instruction to determine a data storage address corresponding to the address operand; a storage data acquisition unit including circuitry configured to execute the second split instruction to acquire data content corresponding to the data operand; and a memory operation unit including circuitry configured to store the acquired data content to the determined data storage address in a data storage region.

According to some embodiments of the present disclosure, there is provided a processor, including the instruction execution device according to the present disclosure. The instruction execution device comprising an instruction splitting unit including circuitry configured to split a data storage instruction into a first split instruction and a second split instruction, wherein the first split instruction is associated with an address operand of the data storage instruction, and the second split instruction is associated with a data operand of the data storage instruction; an instruction address generation unit including circuitry configured to execute the first split instruction to determine a data storage address corresponding to the address operand; a storage data acquisition unit including circuitry configured to execute the second split instruction to acquire data content corresponding to the data operand; and a memory operation unit including circuitry configured to store the acquired data content to the determined data storage address in a data storage region.

According to some embodiments of the present disclosure, there is provided a processor, including: an instruction fetch unit including circuitry configured to acquire an instruction to be executed; an instruction decoding unit including circuitry configured to decode the acquired instruction to determine a type and an operand of the instruction, the instruction comprising a data loading instruction of the type of data loading and a data storage instruction of the type of data storage; an instruction splitting unit including circuitry configured to split the data storage instruction into a first split instruction and a second split instruction, wherein the first split instruction is associated with an address operand of the data storage instruction, and the second split instruction is associated with a data operand of the data storage instruction; an instruction issue unit including circuitry configured to store the decoded instruction for issuing and execution, wherein the instruction issue unit comprises: a first storage unit communicatively coupled to the instruction decoding unit and the instruction splitting unit and configured to receive and store the decoded data loading instruction and the first split instruction for issuing and execution; and a second storage unit communicatively coupled to the instruction splitting unit and configured to receive and store the second split instruction for issuing and execution; and an instruction execution unit including circuitry configured to execute the instruction issued from the instruction issue unit, the instruction execution unit configured to execute data loading and storing operation, wherein the instruction execution unit comprises:

an instruction address generation unit including circuitry configured to receive an instruction issued by the first storage unit and execute the data loading instruction and the first split instruction to determine a data storage address corresponding to the address operand; a storage data acquisition unit including circuitry configured to receive an instruction issued by the second storage unit and execute the second split instruction to acquire data content corresponding to the data operand; a storage instruction buffer communicatively coupled to the instruction address generation unit and configured to store the first split instruction and the determined data storage address, wherein the storage instruction buffer is configured to, after the storage data acquisition unit acquires the data content, correlate the acquired data content and the stored data storage address according to a correspondence between the first split instruction and the second split instruction; and a memory operation unit including circuitry configured to store the acquired data content to the determined data storage address in a data storage region.

According to some embodiments of the present disclosure, there is provided a system on chip, including a processor including an instruction execution device comprising: an instruction splitting unit including circuitry configured to split a data storage instruction into a first split instruction and a second split instruction, wherein the first split instruction is associated with an address operand of the data storage instruction, and the second split instruction is associated with a data operand of the data storage instruction; an instruction address generation unit including circuitry configured to execute the first split instruction to determine a data storage address corresponding to the address operand; a storage data acquisition unit including circuitry configured to execute the second split instruction to acquire data content corresponding to the data operand; and a memory operation unit including circuitry configured to store the acquired data content to the determined data storage address in a data storage region.

According to the schemes of the present disclosure, the data storage instruction is split into a first split instruction associated with the data storage address and a second split instruction associated with the data content. In some embodiments, the first split instruction and the data loading instruction are similarly executed. In some embodiments, the data storage processing may be executed when the data content is acquired by executing the second split instruction, so that the processing on an existing processing pipeline may not be blocked due to data dependency. On the other hand, since the processing for the first split instruction is the same as that for the existing instruction, a processing logic for the second split instruction may be additionally added, which does not complicate the design of the pipeline.

BRIEF DESCRIPTION OF THE DRAWINGS

To achieve the above and related objects, certain illustrative aspects will be described herein with respect to the following description and the accompanying drawings, which indicate various ways in which the principles disclosed herein can be practiced, and that all aspects and their equivalents are intended to fall within the scope of the claimed subject matter. By reading the detailed description below in conjunction with the accompanying drawings, the above as well as other objects, features and advantages of the disclosure may become more apparent. Throughout the disclosure, the same reference numbers generally refer to the same parts or elements.

DETAILED DESCRIPTION

Exemplary embodiments of the present disclosure will be described in more detail below with reference to the accompanying drawings. While exemplary embodiments of the present disclosure are shown in the drawings, it should be understood that the present disclosure may be implemented in various forms and should not be limited by the embodiments set forth herein. Rather, these embodiments are provided to enable a more thorough understanding of the present disclosure and to fully convey the scope of the present disclosure to those skilled in the art.

Data conflicts among pipelining conflicts may occur between two data-dependent instructions, such as storage instruction and loading instruction. In some embodiments, a memory copy instruction may include a program that transfers data from one address interval to another address interval and that performs a large number of memory loading or storage operations on both address intervals at the same time. For each storage instruction, the data to be written may depend on the data transferred by the previous loading instruction. Sometimes the loading instruction takes a relatively long time to read data, which results in that the storage instruction fails to acquire data and cannot perform a memory write operation, thus affecting the execution efficiency of the storage instruction and the overall program flow.

The embodiments of the present disclosure provide techniques that overcome the execution efficiency problems caused by data conflicts.

Figure 1:
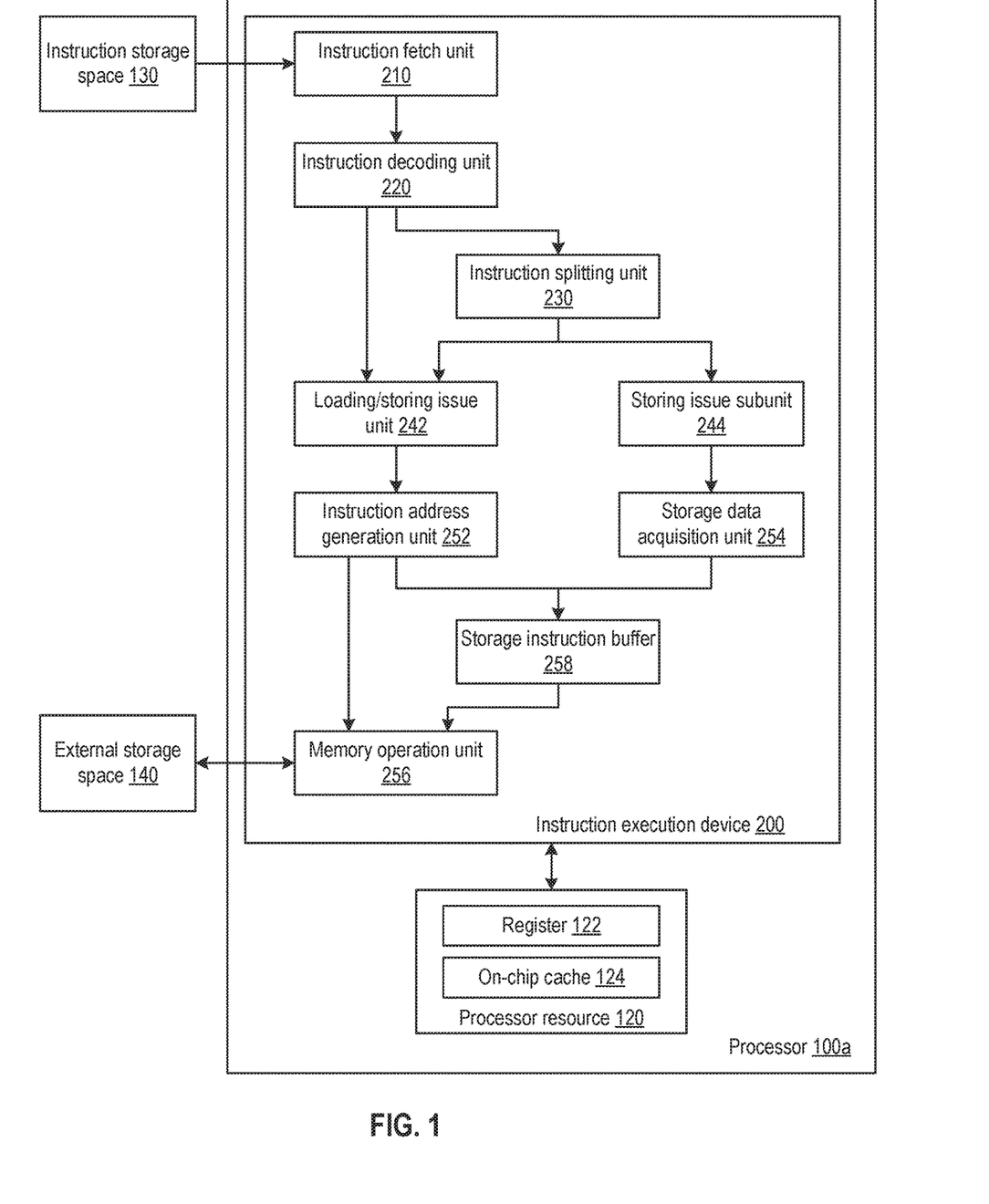
FIG. 1 shows a schematic diagram of a processor according to some embodiments of the present disclosure.

FIG. 1 shows a schematic diagram of a processor 100a according to some embodiments of the present disclosure. In some embodiments, processor 100a includes an instruction execution device 200 and a processor resource 120. Instruction execution device 200 may acquire an instruction from an instruction storage space 130 communicatively coupled to processor 100a and execute the instruction. When executing the instruction, instruction execution device 200 can interact with processor resource 120, for example, including writing one or more values into a register 122 of processor resource 120 and acquiring content from register 122 to control execution of the instruction. Instruction execution device 200 can also store data in an on-chip cache 124 of processor resource 120, transmit the data to an external storage space 140 communicatively coupled to processor 100a, or load data from on-chip cache 124 or from external storage space 140 during the execution of the instruction.

Processor 100a may support a specific instruction set. The instruction set may define a set of instruction types that can be executed by processor 100a. The instruction set may define various types of instructions. One instruction may include an opcode and an operand. The opcode may indicate what the instruction does (e.g., what operation(s) may be executed by processor 100a). A source operand in the operand may indicate a data source (e.g., the data to be delivered or the address of a register or a memory space of the data to be delivered) at the time the instruction is executed. A destination operand may indicate an address of a register or a memory space associated with storing an execution result of the instruction. The source operand and the destination operand often involve the use of a register. For example, the source operand may indicate a value stored in the register or a value at a storage space location (e.g., an address) of which is stored in the register. A register associated with the source operand can be referred to as a source register. The destination operand may indicate a register to save the execution result or an address of a storage location for storing the execution result (e.g., at a storage location indicated by the value in the register). The register associated with the destination operand can be referred to as a destination register.

One type of instructions may include data operation-related instructions, which may include data storage instructions or data loading instructions.

In some embodiments, a data storage instruction (e.g., st.w, or any other suitable storage instructions) can be used to read data (e.g., from an immediate value, a value stored in a register, a memory space, an operation result of another instruction, or any other suitable data source), and write the data into a particular location in memory, such as in on-chip cache 124 or external storage space 140, or any other suitable place. In some embodiments, the source operand in the data storage instruction may include an address operand associated with the storage location (e.g., a register, a memory space, or any other suitable place) of the data to be written. In some embodiments, the source operand may include a data operand associated with data content to be written (e.g., such as an immediate value, or an execution result from another instruction). In some embodiments, the data content may be obtained from various sources, such as from a previous data loading instruction, a register, a memory space, an operation instruction, or any other suitable source. The data storage instruction may further include a destination operand (e.g., an address operand or a data operand) associated with a storage location for storing the data obtained from the source operand. In some embodiments, the data storage instruction may write data obtained from the source into the memory space identified by the destination operand when a condition is satisfied (e.g., when the data content to be written is ready for writing, when the data content is fetched from the source indicated by the source operand, when a pre-scheduled event occurs, or when any other suitable triggering condition to write the data is met).

In some embodiments, a data loading instruction (1*d*.w or any other suitable load instructions) can be used to read data from a memory space, such as from on-chip cache 124 or external storage space 140. In some embodiments, the source operand of the data loading instruction may include an address operand associated with the storage location of the data to be read. The data loading instruction may not include a destination operand, as the data loading instruction may not involve writing data into the memory.

Instruction execution device 200 may include an instruction fetch unit 210. Instruction fetch unit 210 may include circuitry configured to acquire an instruction to be executed from instruction storage space 130 and send the fetched instruction to an instruction decoding unit 220. Instruction decoding unit 220 may include circuitry configured to decode the instruction and determine the instruction type and the operands in the instruction. For example, instruction decoding unit 220 can be configured to determine an instruction related to data operation, such as a data loading instruction or a data storage instruction. Instruction decoding unit 220 can also be configured to determine the source operand in the data storage instruction, and further determine the data operand and the address operand in the source operand.

In some embodiments, instruction decoding unit 220 may send the determined data storage instruction to an instruction splitting unit 230. Instruction splitting unit 230 may include circuitry configured to split the data storage instruction into two parts, which are in the form of instructions to be executed, and may be referred to as split instructions (e.g., such as pseudo instruction, or other type of suitable instructions) for subsequent processing as instructions. As described above, the operand of the data storage instruction includes an operand associated with the storage address and an operand associated with the data content. Accordingly, instruction splitting unit 230 can be configured to split the data storage instruction into a first split instruction and a second split instruction. In some embodiments, the first split instruction is associated with an address instruction, such as st.addr, st_addr, or in other suitable instruction form. The first split instruction may be associated with determining the storage address (e.g., associated with the address operand) in source operand or destination operand. In some embodiments, the second split instruction is associated with a data instruction, such as st.data, st_data, or in other suitable instruction form. The second split instruction may be associated with fetching the data content (e.g., associated with the data operand) in the source operand of the data storage instruction. It is appreciated that the present disclosure is not limited by the specific forms of the first split instruction (e.g., may also referred to as an address instruction) and the second split instruction (e.g., may also referred to as data instruction). Any forms of address instruction or data instruction are consider as falling within the scope of the present disclosure when the address instruction (e.g., st_addr) contains the address operand part in the data storage instruction, the data instruction (e.g., st_data) includes the data operand part in the data storage instruction, and the address instruction and data instruction can be identified and processed by a subsequent instruction processing part.

In some embodiments, an instruction address generation unit 252 includes circuitry configured to receive the first split instruction, e.g., the address instruction st_addr, split out by instruction splitting unit 230, and process the address instruction to determine (e.g., calculate) a data storage address corresponding to the address operand in the address instruction st_addr. In some embodiments, instruction address generation unit 252 also includes circuitry configured to acquire the data loading instruction from instruction decoding unit 220. In some embodiments, instruction address generation unit 252 may be configured to determine (e.g., calculate) a corresponding data loading address for the address operand in the data loading instruction.

In some embodiments, a storage data acquisition unit 254 includes circuitry configured to receive the second split instruction, e.g., data instruction st_data, split out by instruction splitting unit 230 and process the data instruction st_data to acquire data content corresponding to the data operand.

In some embodiments, the data content may be from multiple data sources. In some embodiments, storage data acquisition unit 254 may include circuitry configured to acquire data from one or more registers (e.g., register 122 or other register(s)) of processor resource 120. In some embodiments, storage data acquisition unit 254 may be configured to acquire data from other execution units. In some embodiments, the other execution units may include various arithmetic units, such as an integer arithmetic unit, a vector arithmetic unit, or other suitable units that can provide data source for various instructions to be executed by processor 100*a*. For example, the arithmetic units may perform arithmetic operations to generate data and provide the data to storage data acquisition unit 254. In some embodiments, the other execution unit that may provide data to storage data acquisition unit 254 may be included in instruction execution device 200 in FIGS. 1 and 2. It is also appreciated that these execution unit can also be included in any other suitable location, such as outside instruction execution device 200 but within processor 100*a* or 100*b*, or outside processor 100*a* or 100*b*. In some embodiments, storage data acquisition unit 254 may also be configured to acquire data from on-chip cache 124 or external storage space 140. The present disclosure is not limited by the specific form of the data source, and any way in which data can be generated or acquired by processor 100*a* is within the scope of the present disclosure.

Although FIG. 1 shows a loading/storing issue unit 242 communicatively coupled between instruction splitting unit 230 and instruction address generation unit 252 (further discussed in more details below), it is appreciated that loading/storing issue unit 242 may be optional to processor 100*a*. When processor 100*a* does not include loading/storing issue unit 242, instruction splitting unit 230 may directly send the first split instruction (e.g., address instruction) of the data storage instruction to instruction address generation unit 252 for processing (e.g., determining the data storage address corresponding to the address operand in the data storage instruction. Instruction decoding unit 220 may also directly send the data loading instruction to instruction address generation unit 252 for processing (e.g., determining the data loading address for the address operand in the data loading instruction). In some embodiments, a storing issue subunit 244 as shown in FIG. 1 may also be optional (further discussed in more details below). When processor 100*a* does not include storing issue subunit 244, instruction splitting unit 230 may directly send the second split instruction (e.g., data instruction) of the data storage instruction to storage data acquisition unit 254 for processing (e.g., getting instructed to acquire data content corresponding to the data operand in the data storage instruction). In some embodiments, instead of using loading/storing issue unit 242 or storing issue subunit 244, other types of components, such as buffers, queues, or units may be used for storing or processing the split instructions of the data storage instruction, the data loading instruction, or any other suitable instruction. The results from processing or executing the split instructions or the data loading instructions can also be stored in suitable components, such as buffers, queues, or units, prior to processing by memory operation unit 256.

After storage data acquisition unit 254 acquires the data content according to the data instruction st_data, a memory operation unit 256 may include circuitry configured to store the acquired data content at the data storage address calculated by instruction address generation unit 252. In some embodiments, memory operation unit 256 can be configured to write data into on-chip cache 124 or external storage space 140. In some embodiments, memory operation unit 256 may be configured to first write data into on-chip cache 124. When there is not enough space within cache 124 or when other conditions are satisfied (e.g., as specified in the data storage instruction, or as predefined by the system, etc.), the data may be written from on-chip cache 124 into external storage space 140 via, e.g., a bus interface unit of memory operation unit 256.

The present disclosure is not limited by the specific form of memory operation unit 256, and any suitable ways in which the data content can be written into on-chip cache 124 or written into external storage space 140 are within the scope of the present disclosure.

In some embodiments, for the data loading instruction, it may not wait for acquiring the data content from storage data acquisition unit 254. Accordingly, after instruction address generation unit 252 determines or calculates the data storage address for the data loading instruction, memory operation unit 256 can read (e.g., load) data directly from the calculated data storage address to complete execution of the data loading instruction.

In some embodiments, storage data acquisition unit 254 may be configured to acquire data from on-chip cache 124 or external storage space 140 via memory operation unit 256 so as to acquire the data content for the data instruction st_data of the data storage instruction.

In some embodiments, it may take a relatively long time for storage data acquisition unit 254 to acquire the data content from various data sources, for example, from external storage space 140. Meanwhile, instruction address generation unit 252 may have calculated the data storage address for the address instruction st_addr. In some embodiments, instruction execution device 200 may further include a storage instruction buffer 258. In some embodiments, storage instruction buffer 258 is communicatively coupled to instruction address generation unit 252. After instruction address generation unit 252 calculates the data storage address corresponding to the address operand for the address instruction st_addr, the address instruction st_addr and the calculated data storage address can be stored in storage instruction buffer 258.

In some embodiments, after storage data acquisition unit 254 acquires the data content according to the data instruction st_data, information merging may be performed to the first and second split instructions, e.g., the data instruction st_data and the corresponding address instruction st_addr by storage instruction buffer 258. Information merging may include correlating the acquired data content and the stored data storage address according to the correspondence between the address instruction and the data instruction (e.g., split from the same data storage instruction). In some embodiments, through information merging, various parts of the data storage instruction that were split by instruction splitting unit 230 can be remerged together, and the relevant work prior to the data storage operation may have been completed. Accordingly, after information merging, memory operation unit 256 can store the acquired data content to the calculated data storage address.

Figure 2:
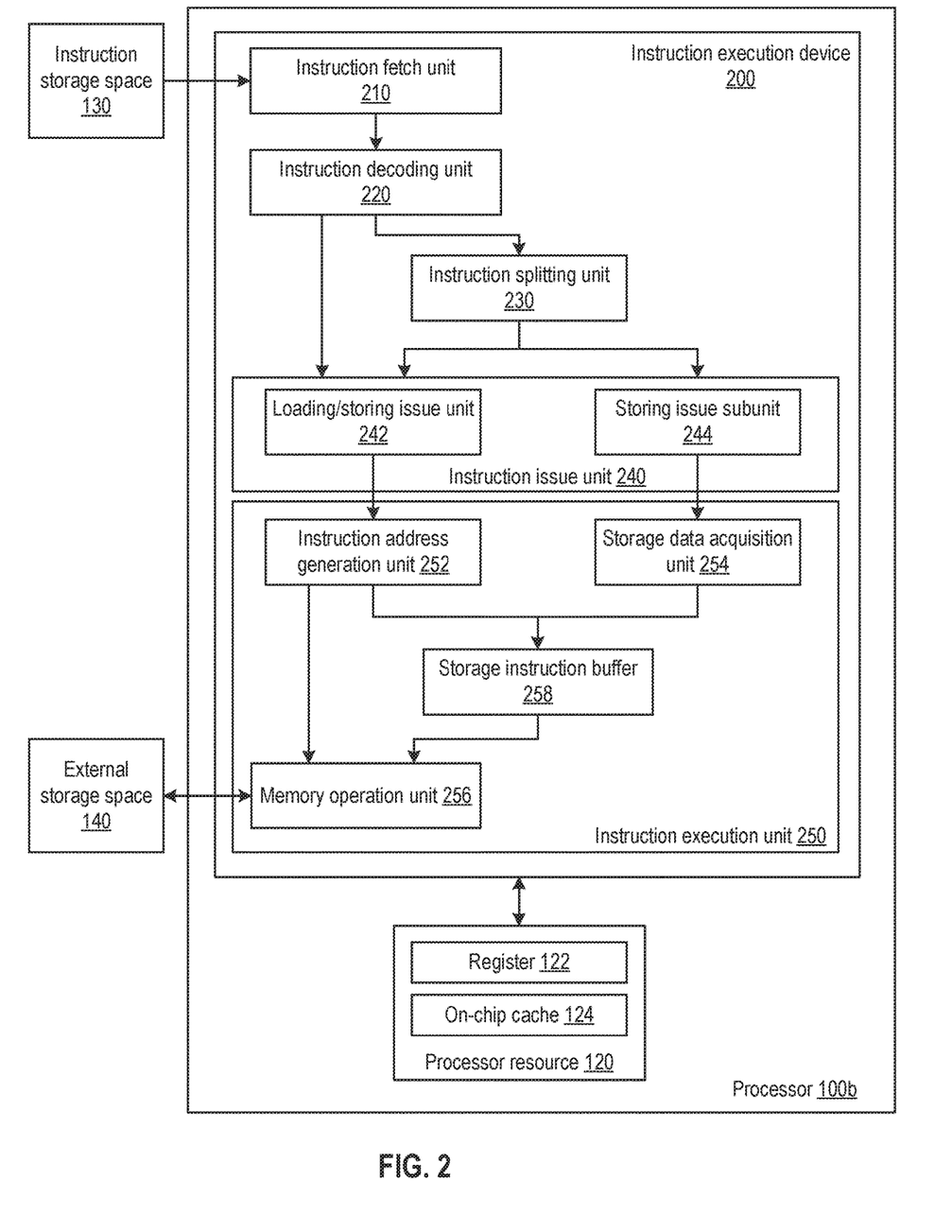
FIG. 2 shows a schematic diagram of a processor according to some embodiments of the present disclosure.

In some embodiments, storage instruction buffer 258 may be optional to processor 100*a* or 100*b*. When processor 100*a* or 100*b* does not include storage instruction buffer 258, the determined data storage address determined by instruction address generation unit 252 and the data content acquired by storage data acquisition unit 254 may be stored separately at suitable storage spaces respectively. When a condition is satisfied (e.g., the data content is ready to be written, or predetermined trigger event occurs), the determined data storage address and the acquired data content may be sent to memory operation unit 256 for execution. In accordance, memory operation unit 256 may store the acquired data content at the determined data storage address.

In some embodiments, when processor 100*a* performs instruction processing in a pipelining manner, it may schedule the execution of the instruction after the instruction is decoded. To this end, processor 100*a* may further include an instruction issue unit (e.g., an instruction issue unit 240 in FIG. 2) for scheduling the execution after decoding the instruction. For a high-performance processor, parallel operation of instructions can play an indispensable role. Accordingly, how to allocate instructions to different execution units efficiently is important, and the instruction issue unit (e.g., instruction issue unit 240) can play the role of controlling or scheduling instructions.

In some embodiments, processor 100*a* includes a loading/ storing issue unit 242 and a storing issue subunit 244. In some embodiments, loading/storing issue unit 242 is communicatively coupled between instruction splitting unit 230 and instruction generation unit 252 and may be configured to receive the address instruction st_addr acquired from instruction splitting unit 230 after instruction splitting unit 230 splits the data storage instruction. Loading/storing issue unit 242 may be configured to store the address split instruction in a first issue queue (e.g., also referred to as a first queue, such as a loading/storing issue queue) so as to issue the address split instruction to instruction address generation unit 252 for execution when a condition is satisfied (e.g., the corresponding data content is ready for storage, or other predetermined triggering event occurs). In some embodiments, loading/storing issue unit 242 is further communicatively coupled between instruction decoding unit 220 and instruction address generation unit 252, and configured to acquire the data loading instruction, store the data loading instruction and the address instruction st_addr together in the first issue queue, and perform the corresponding subsequent processing.

In some embodiments, storing issue subunit 244 is communicatively coupled between instruction splitting unit 230 and storage data acquisition unit 254, and may be configured to receive the data instruction st_data acquired from instruction splitting unit 230 after instruction splitting unit 230 splits the data storage instruction. Storing issue subunit 244 may be configured to store the data instruction in a second issue queue (e.g., also referred to as a second queue, such as a storing issue subqueue) so as to issue the data instruction to storage data acquisition unit 254 for execution when a condition is satisfied (e.g., the data content is ready for storage, or other predetermined triggering event occurs).

In some embodiments, after the instruction is scheduled for execution, there may be a plurality of data instructions st_data that are ready to be executed in storage data acquisition unit 254. Storage data acquisition unit 254 may be configured to acquire the data content for one data instruction st_data at a time, so as to simplify the structure of storage data acquisition unit 254. As the data storage instruction is split, such a simplified structure may not affect the execution efficiency of the data storage instruction.

According to the structural diagram of processor 100*a* shown in FIG. 1, especially the structural diagram of instruction processing device 200, instruction splitting unit 230 can be utilized to split the data and address parts of the data storage instruction into two split instructions, respectively. The address part of the data storage instruction can be processed together with the data loading instruction, while the data part can be processed with a relatively low resource overhead by means of a separate split instruction, thus solving the problem of instruction processing blocking due to data dependency without losing performance.

FIG. 2 shows a schematic diagram of a processor 100*b* according to some embodiments of the present disclosure. Processor 100*b* shown in FIG. 2 may be similar or include components that are similar to processor 100*a* shown in FIG. 1, Accordingly, the same or similar components in FIG. 2 as those in FIG. 1 are denoted by the same reference numerals and may not be described repeatedly.

As shown in FIG. 2, processor 100*b* may include an instruction issue unit 240 and an instruction execution unit 250. In some embodiments, instruction issue unit 240 includes loading/storing issue unit 242 and storing issue subunit 244. For an instruction associated with data operation, as described above with reference to FIG. 1, the data loading instruction decoded by instruction decoding unit 220 and the address instruction st_addr obtained by splitting the data storage instruction by instruction splitting unit 230 may be sent to loading/storing issue unit 242 for subsequent processing. The data instruction st_data obtained by splitting the data storage instruction by instruction splitting unit 230 may be sent to storing issue subunit 244 for subsequent processing. Other instructions decoded by instruction decoding unit 220 may be sent to other components in instruction issue unit 240 for processing.

In some embodiments, instruction execution unit 250 includes instruction address generation unit 252, storage data acquisition unit 254, memory operation unit 256, and storage instruction buffer 258 described above with reference to FIG. 1, for processing the data loading instruction and data operation instruction as described above with reference to FIG. 1.

Processor 100*b* shown in FIG. 2 illustrates various components in instruction execution device 200 in a pipelining manner. These components are divided based on functional logic and can be implemented by means of different hardware according to the functions to be implemented. Various suitable hardware implementations are within the scope of the present disclosure.

In some embodiments, processor 100*a* in FIG. 1 or 100*b* in FIG. 2 can be part of a processing system. The processing system may include other components, such as various interrupt sources, coprocessors, storage devices, or the like, so that a functionally complete processing system is constructed around the processor. According to some embodiments, such processing system may include, for example, an SoC (System on Chip) or the like.

Figure 3:
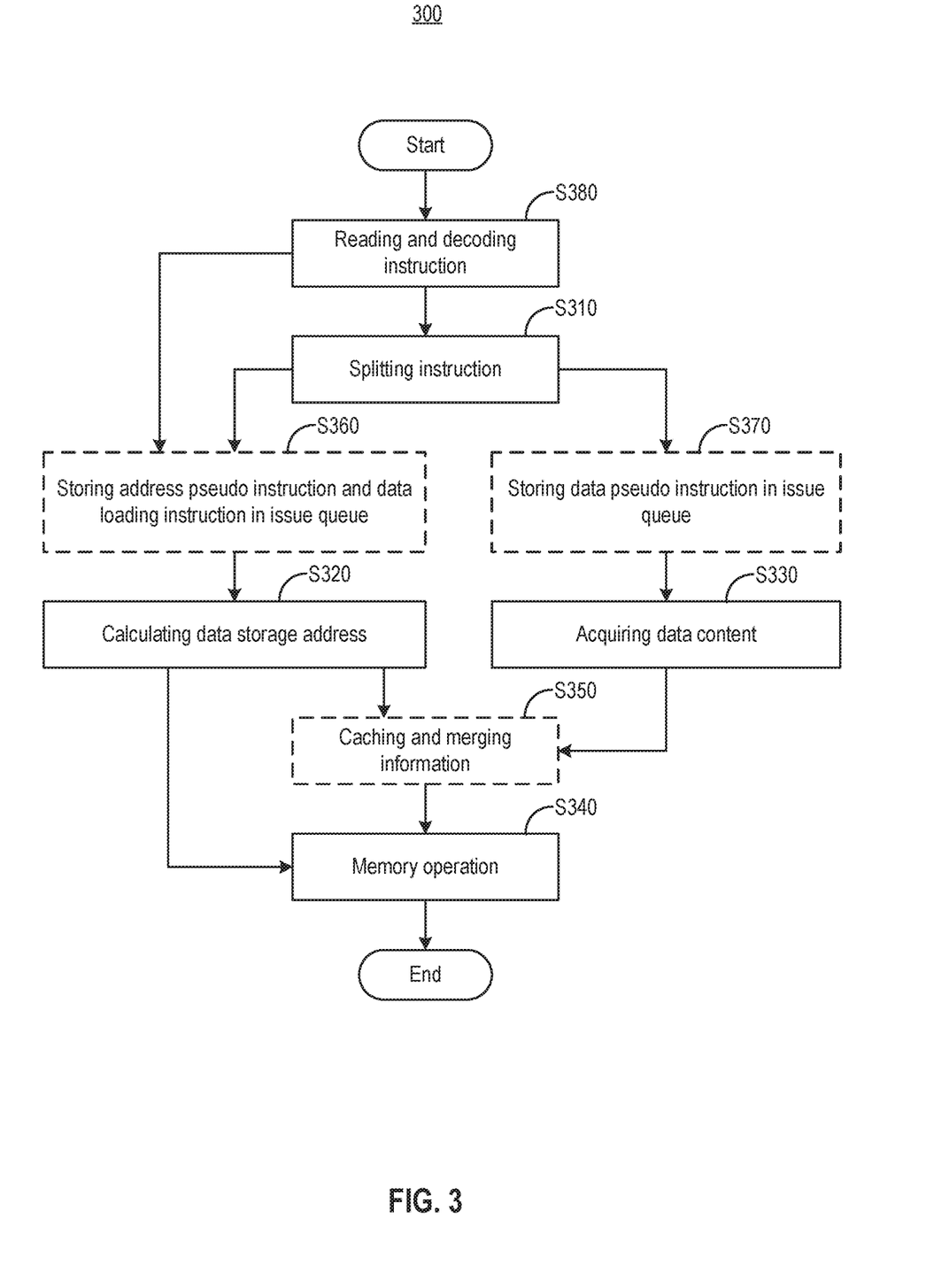
FIG. 3 shows a schematic flowchart of a method for executing a data storage instruction according to some embodiments of the present disclosure.

FIG. 3 shows a schematic flowchart of a method 300 for executing a data storage instruction according to some embodiments of the present disclosure. In some embodiments, one or more steps of method 300 in FIG. 3 may be performed by processor 100*a* or 100*b* as shown in FIGS. 1 and 2, especially in instruction execution device 200.

In some embodiments, the method 300 may include step S380, in which an instruction is acquired and decoded (e.g., by instruction fetch unit 210 or instruction decoding unit 220 in FIG. 1 or 2) to determine a data operation related instruction, such as a data storage instruction. In step S380, a data operand and an address operand may also be determined in the data storage instruction for performing instruction splitting in step S310. In some embodiments in step S380, a data loading instruction may be determined, and the corresponding address operand may also be determined for the data loading instruction.

In step S310, the data storage instruction may be split into the address instruction associated with the address operand of the data storage instruction and the data instruction associated with the data operand of the data storage instruction. As described above, the processor can execute various types of instructions defined in the instruction set that the processor supports. In some embodiments, instructions associated with data operations include the data storage instruction for writing data into on-chip cache 124 or external storage space 140, or the data loading instruction for reading data from on-chip cache 124 or external storage space 140. In some embodiments, the source operand in the data storage instruction includes the address operand associated with the storage location where the data is to be written. The source operand in the data storage instruction may further include the data operand associated with the data content to be written. By parsing (e.g., splitting) the data storage instruction, the data storage instruction can be split into the address instruction st_addr and the data instruction st_data according to a predetermined rule. Step S310 may be performed by instruction splitting unit 230 described above with reference to FIG. 1 or 2.

In step S320, the address instruction st_addr obtained by splitting the data storage instruction in step S310 can be processed to calculate the data storage address corresponding to the address operand. Step S320 may be performed by instruction address generation unit 252 described above with reference to FIG. 1 or 2.

In step S330, the data instruction st_data obtained by splitting the data storage instruction in step S310 can be processed to acquire the data content corresponding to the data operand. Step S330 may be performed by storage data acquisition unit 254 shown above with reference to FIG. 1 or 2.

In some embodiments, at step S330, the data content may be acquired from multiple data sources. In some embodiments, data may be acquired from the register (e.g., register 122) of processor resource 120. In some embodiments, a result of operation acquired from other execution units as discussed herein may be used as the data content. In some embodiments, data may be acquired from on-chip cache 124 or external storage space 140. The present disclosure is not limited by the specific form of the data source, and any way in which data can be generated or acquired by processor 100a or 100b is within the scope of the present disclosure.

In step S340, the data content acquired in step S330 may be stored at the data storage address calculated in step S320. In some embodiments, step S340 may be performed in memory operation unit 256 described above with reference to FIG. 1 or 2. After the completion of step S340, the execution of the data storage instruction may be completed.

In some embodiments, it may take a relatively long time to acquire the data content from various data sources, such as from external storage space 140 in step S330. Meanwhile in step S320, the speed of calculating the data storage address for the address instruction st_addr is relatively fast. Accordingly, the calculation result of step S320 may be stored while waiting for acquiring the data content in step S330. In some embodiments, method 300 may further include step S350, in which the address instruction st_addr and the data storage address calculated in step S320 may be stored. At the same time, in step S350, after acquiring the data content for the data instruction st_data in step S330, an information merging process may be performed (e.g., by storage instruction buffer 258, FIG. 1 or 2) to the data instruction st_data and the corresponding address instruction st_addr. Information merging may include correlating the acquired data content and the stored data storage address according to the correspondence between the address instruction and the data instruction (e.g., split from the same data storage instruction). In some embodiments, through information merging, various parts of the data storage instruction that are split at step S310 can be remerged together, and all the work prior to the data storage operation may have been completed. Accordingly, after information merging in step S350, in step S340, the acquired data content may be stored at the calculated data storage address (e.g., calculated in step S320).

In some embodiments, when the processor (e.g., processor 100a or 100b) performs instruction processing in a pipelining manner, the execution of the instruction may be scheduled after the instruction is decoded. For a high-performance processor, the parallel operation of instructions may play an important role. Accordingly, how to allocate instructions to different execution units efficiently can be important, and an instruction issue operation as discussed herein may play the role of controlling or scheduling instructions (e.g., or other type of tasks associated with allocating instructions).

In some embodiments, method 300 further includes steps S360 and S370 as shown in FIG. 3. In step S360, the address instruction st_addr obtained by splitting the data storage instruction in step S310 may be stored (e.g., by loading/storing issue unit 242 in FIG. 1 or 2) in a first issue queue, such as a loading/storing issue queue, so that when an issue condition is met, the address instruction may be fetched from the first issue queue to be issued to step S320 for calculating the corresponding data storage address. In step S360, the data loading instruction may also be processed similarly (e.g., stored, or fetched to be issued to step S320), so that the data loading instruction and the address instruction st_addr may be processed in substantially the same way.

In step S370, the data instruction st_data obtained by splitting the data storage instruction in step S310 may be stored (e.g., by storing issue subunit 244, FIG. 1 or 2) in a second issue queue, such as a storing issue subqueue, so that when an issue condition is met, the data instruction may be issued from the second issue queue to step S330 for execution to acquire the data content. To the extent that steps S360 and S370 are optional, when these steps are not included in method 300, split instructions may directly set from step S310 to steps S320 and S330, bypassing steps S360 and S370. When step S350 is not included in method 300, the determined data storage address and the acquired data content may be set to step S340 for processing, bypassing step S350.

Figure 4:
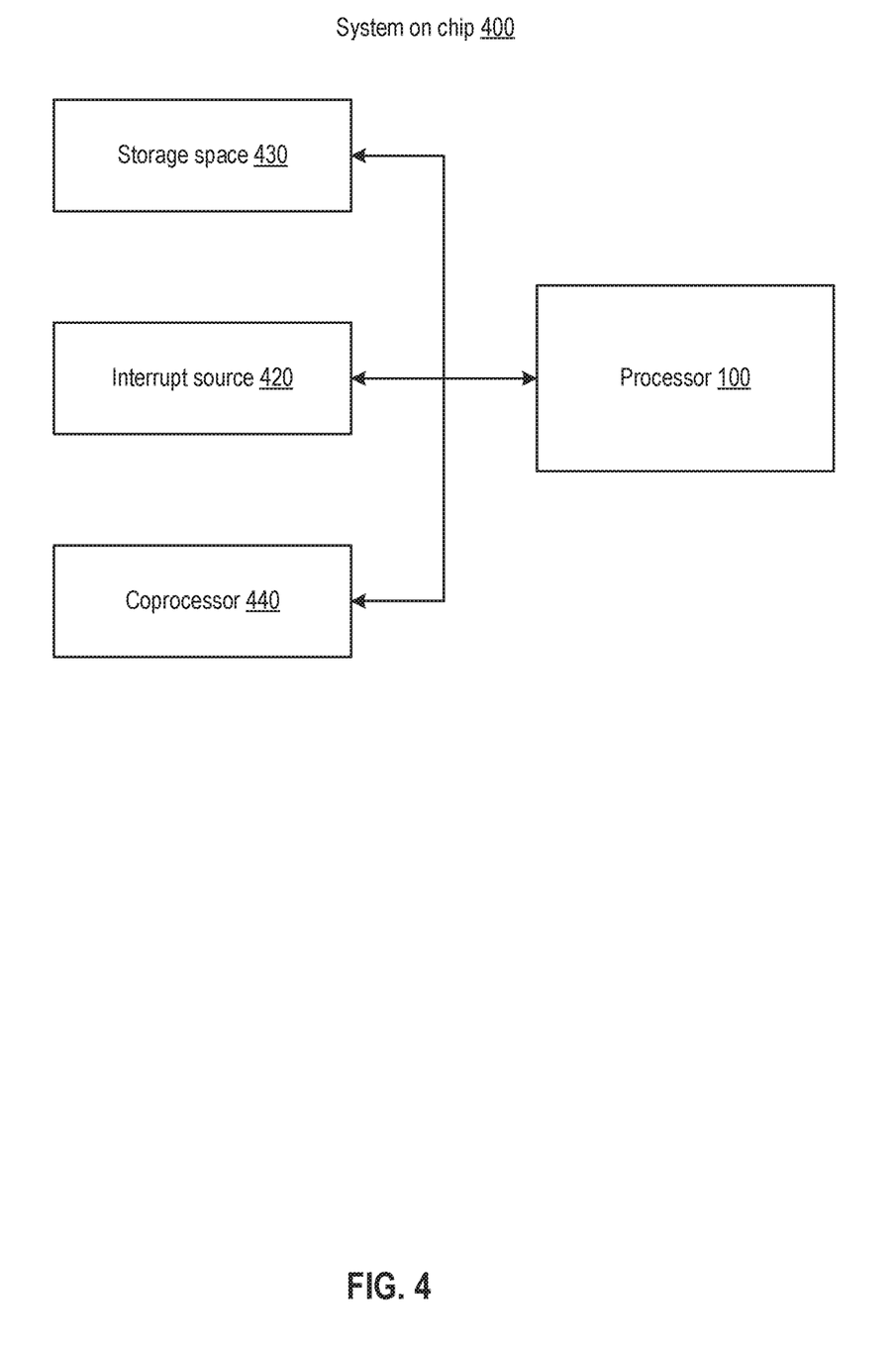
FIG. 4 shows a schematic diagram of a system on chip according to some embodiments of the present disclosure.

FIG. 4 shows a schematic diagram of a system on chip (SoC) 400 according to some embodiments of the present disclosure. In some embodiments, system on chip 400 includes processor 100 (e.g., processor 100a or 100b) described with reference to FIGS. 1 and 2, various interrupt sources 420, a storage space 430, a coprocessor 440 (e.g., such as a hardware accelerator), and the like. System on chip 400 can be integrated on one circuit board to form a relatively complete processing system. Interrupt sources 420 may include, for example, various peripheral interfaces that receive external inputs and output the processed outputs of processor 100. Storage space 430 can provide processor 100 with an external storage space for storing codes to be executed by processor 100 and various output data generated. Coprocessor 440 is a specialized processor for performing specialized processing tasks, such as image operations and the like.

The embodiments may further be described using the following clauses:

1. A method for executing a data storage instruction in a processor, comprising:

splitting the data storage instruction into a first split instruction and a second split instruction, wherein the first split instruction is associated with an address operand of the data storage instruction, and the second split instruction is associated with a data operand of the data storage instruction;

executing the first split instruction to determine a data storage address corresponding to the address operand;

executing the second split instruction to acquire data content corresponding to the data operand; and storing the acquired data content to the determined data storage address in a data storage region.

2. The method of clause 1, further comprising:

after determining the data storage address, storing the first split instruction and the data storage address; and after acquiring the data content, correlating the acquired data content and the stored data storage address according to a correspondence between the first split instruction and the second split instruction, so as to store the acquired data content to the determined data storage address.

3. The method of any of clauses 1-2, further comprising:

storing the first split instruction and a data loading instruction in a first issue queue; and storing the second split instruction in a second issue queue different from the first issue queue;

wherein executing the first split instruction to determine the data storage address comprises:

issuing the first split instruction from the first issue queue, and wherein executing the second split instruction to acquire the data content comprises:

issuing the second split instruction from the second issue queue.

4. The method of any of clauses 1-3, further comprising:

acquiring the data storage instruction and decoding the data storage instruction to determine the data operand and the address operand in the data storage instruction.

5. The method of any of clauses 1-4, wherein the data content comprises any one or more of:

a register value, an operation result of an arithmetic unit, or data from the data storage region.

6. An instruction execution device in a processor, comprising:

an instruction splitting unit including circuitry configured to split a data storage instruction into a first split instruction and a second split instruction, wherein the first split instruction is associated with an address operand of the data storage instruction, and the second split instruction is associated with a data operand of the data storage instruction;

an instruction address generation unit including circuitry configured to execute the first split instruction to determine a data storage address corresponding to the address operand;

a storage data acquisition unit including circuitry configured to execute the second split instruction to acquire data content corresponding to the data operand; and a memory operation unit including circuitry configured to store the acquired data content to the determined data storage address in a data storage region.

7. The instruction execution device of clause 6, further comprising:

a storage instruction buffer communicatively coupled to the instruction address generation unit and configured to store the first split instruction and the determined data storage address, wherein the storage instruction buffer is further configured to, after the storage data acquisition unit acquires the data content, correlate the acquired data content and the stored data storage address according to a correspondence between the first split instruction and the second split instruction, so that the acquired data content is stored to the determined data storage address by the memory operation unit.

8. The instruction execution device according to any of clauses 6-7, further comprising:

a first storage unit communicatively coupled to the instruction splitting unit and configured to receive and store the first split instruction for issuing and execution; and a second storage unit communicatively coupled to the instruction splitting unit and configured to receive and store the second split instruction for issuing and execution;

wherein:

the first storage unit is communicatively coupled to the instruction address generation unit and configured to issue the first split instruction to the instruction address generation unit to determine the data storage address, and the second storage unit is communicatively coupled to the storage data acquisition unit and configured to issue the second split instruction to the storage data acquisition unit to acquire the data content corresponding to the data operand.

9. The instruction execution device of any of clauses 6-8, further comprising:

an instruction fetch unit including circuitry configured to acquire a data operation instruction including a data loading instruction and the data storage instruction; and an instruction decoding unit including circuitry configured to:

decode the acquired data operation instruction to determine the data storage instruction in the data operation instruction;

determine the data operand and the address operand in the data storage instruction; and send the data storage instruction to the instruction splitting unit.

10. The instruction execution device of any of clauses 6-9, wherein the storage data acquisition unit is further configured to acquire the data content via the memory operation unit.

11. The instruction execution device of any of clauses 6-10, further comprising an arithmetic unit, wherein the storage data acquisition unit is further configured to acquire an operation result from the arithmetic unit as the data content.

12. The instruction execution device of any of clauses 6-11, wherein the storage data acquisition unit is further configured to acquire a register value as the data content.

13. The instruction execution device of any of clauses 6-12, wherein the storage data acquisition unit is further configured to acquire the data content for one second split instruction at a time.

14. A processor, comprising:

an instruction execution device comprising:

an instruction splitting unit including circuitry configured to split a data storage instruction into a first split instruction and a second split instruction, wherein the first split instruction is associated with an address operand of the data storage instruction, and the second split instruction is associated with a data operand of the data storage instruction;

an instruction address generation unit including circuitry configured to execute the first split instruction to determine a data storage address corresponding to the address operand;

a storage data acquisition unit including circuitry configured to execute the second split instruction to acquire data content corresponding to the data operand; and a memory operation unit including circuitry configured to store the acquired data content to the determined data storage address in a data storage region.

15. The processor of clause 14, wherein the instruction execution device further comprises:

a storage instruction buffer communicatively coupled to the instruction address generation unit and configured to store the first split instruction and the determined data storage address, wherein the storage instruction buffer is further configured to, after the storage data acquisition unit acquires the data content, correlate the acquired data content and the stored data storage address according to a correspondence between the first split instruction and the second split instruction, so that the acquired data content is stored to the determined data storage address by the memory operation unit.

16. The processor of any of clauses 14-15, wherein the instruction execution device further comprises:

a first storage unit communicatively coupled to the instruction splitting unit and configured to receive and store the first split instruction for issuing and execution; and a second storage unit communicatively coupled to the instruction splitting unit and configured to receive and store the second split instruction for issuing and execution;

wherein:

the first storage unit is communicatively coupled to the instruction address generation unit and configured to issue the first split instruction to the instruction address generation unit to determine the data storage address, and the second storage unit is communicatively coupled to the storage data acquisition unit and configured to issue the second split instruction to the storage data acquisition unit to acquire the data content corresponding to the data operand.

17. The processor of any of clauses 14-16, wherein the instruction execution device further comprises:

an instruction fetch unit including circuitry configured to acquire a data operation instruction including a data loading instruction and the data storage instruction; and an instruction decoding unit including circuitry configured to:

decode the acquired data operation instruction to determine the data storage instruction in the data operation instruction;

determine the data operand and the address operand in the data storage instruction; and send the data storage instruction to the instruction splitting unit.

18. The processor of any of clauses 14-17, wherein the storage data acquisition unit is further configured to acquire the data content from at least one of: the data storage region via the memory operation unit, an operation result from an arithmetic unit, or a register value, and wherein the storage data acquisition unit is further configured to acquire the data content for one second split instruction at a time.

19. The processor of any of clauses 14-18, further comprising a processor resource communicatively coupled to the instruction execution device, the processor resource including a register or a cache.

20. A processor, comprising:

an instruction fetch unit including circuitry configured to acquire an instruction to be executed;

an instruction decoding unit including circuitry configured to decode the acquired instruction to determine a type and an operand of the instruction, the instruction comprising a data loading instruction of the type of data loading and a data storage instruction of the type of data storage;

an instruction splitting unit including circuitry configured to split the data storage instruction into a first split instruction and a second split instruction, wherein the first split instruction is associated with an address operand of the data storage instruction, and the second split instruction is associated with a data operand of the data storage instruction;

an instruction issue unit including circuitry configured to store the decoded instruction for issuing and execution, wherein the instruction issue unit comprises:

a first storage unit communicatively coupled to the instruction decoding unit and the instruction splitting unit and configured to receive and store the decoded data loading instruction and the first split instruction for issuing and execution; and a second storage unit communicatively coupled to the instruction splitting unit and configured to receive and store the second split instruction for issuing and execution; and an instruction execution unit including circuitry configured to execute the instruction issued from the instruction issue unit, the instruction execution unit configured to execute data loading and storing operation, wherein the instruction execution unit comprises:

an instruction address generation unit including circuitry configured to receive an instruction issued by the first storage unit and execute the data loading instruction and the first split instruction to determine a data storage address corresponding to the address operand;

a storage data acquisition unit including circuitry configured to receive an instruction issued by the second storage unit and execute the second split instruction to acquire data content corresponding to the data operand;

a storage instruction buffer communicatively coupled to the instruction address generation unit and configured to store the first split instruction and the determined data storage address, wherein the storage instruction buffer is configured to, after the storage data acquisition unit acquires the data content, correlate the acquired data content and the stored data storage address according to a correspondence between the first split instruction and the second split instruction; and a memory operation unit including circuitry configured to store the acquired data content to the determined data storage address in a data storage region.

21. A system on chip, comprising:

a processor including an instruction execution device comprising:

an instruction splitting unit including circuitry configured to split a data storage instruction into a first split instruction and a second split instruction, wherein the first split instruction is associated with an address operand of the data storage instruction, and the second split instruction is associated with a data operand of the data storage instruction;

an instruction address generation unit including circuitry configured to execute the first split instruction to determine a data storage address corresponding to the address operand;

a storage data acquisition unit including circuitry configured to execute the second split instruction to acquire data content corresponding to the data operand; and a memory operation unit including circuitry configured to store the acquired data content to the determined data storage address in a data storage region.

22. The system on chip of clause 21, further comprising:

an instruction storage space communicatively coupled to the instruction execution device and configured to provide the data storage instruction to the instruction execution device; and an external storage space communicatively coupled to the instruction execution device and configured to store the acquired data content.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

It should be understood that, in order to simplify the disclosure and to assist in understanding one or more of various aspects of the disclosure, in the description above of the exemplary embodiments of the present disclosure, various features of the present disclosure are sometimes grouped together into individual embodiments, figures or descriptions thereof. However, the method disclosed should not be interpreted as reflecting the intention that the claimed disclosure requires more features than are expressly recited in each claim. Rather, as reflected in the following claims, an inventive aspect lies in the features less than all features of individual embodiments disclosed above. Therefore, the claims in accordance with specific implementations are hereby expressly incorporated into the specific implementations, wherein the claims are by themselves separate embodiments of the present disclosure.

Those skilled in the art will appreciate that a module or unit or component of the device in the example disclosed herein may be arranged in a device as described in the embodiments, or alternatively may be positioned in one or more devices different from the devices in this example. The modules in the foregoing examples may be combined into one or more modules or may be further divided into a plurality of sub-modules.

Those skilled in the art will appreciate that the modules in the devices in the embodiments can be adaptively modified and placed in one or more devices different from the embodiments. The modules or units or components in some embodiments may be combined into one module or unit or component, and further they may be divided into a plurality of sub-modules or sub-units or sub-components. Any combination can be used to combine all features disclosed in this specification (including the accompanying claims, abstract and drawings) and all processes or units of any methods or devices so disclosed, except the features or processes or units that may be mutually exclusive. Unless expressly stated otherwise, each of the features disclosed in this specification (including the accompanying claims, abstract and drawings) may be replaced by alternative features that provide the same, equivalent or similar purpose.

Furthermore, those skilled in the art will appreciate that, although some embodiments described herein include certain features rather than other features included in other embodiments, combinations of features of different embodiments are meant to be within the scope of the present disclosure and form different embodiments. For example, in the following claims, any one of the claimed embodiments can be used in any combination.

Furthermore, some of the embodiments are described herein as methods or combinations of method elements that can be implemented by a processor of a computer system or by other devices that implement the functions. Accordingly, a processor having the necessary instructions for implementing the method or method element forms a device for implementing the method or method element. Furthermore, the elements described herein of the device embodiments are examples of devices for implementing functions that are implemented by elements for the purpose of implementing the disclosure.

As used herein, the use of ordinal numbers "first," "second," "third," and the like to describe generic objects simply indicates different examples involving similar objects unless specified otherwise and is not intended to imply that the objects so described must have a given order in time, space, order, or in any other ways.

While the present disclosure has been described in terms of a limited number of embodiments, those skilled in the art will appreciate from the above description that other embodiments are conceivable within the scope of the present disclosure. Furthermore, it should be noted that the language used in this specification is selected primarily for readability and instructional purposes, rather than for explaining or limiting the subject matter of the present disclosure. Therefore, many modifications and changes will be apparent to those of ordinary skill in the art without departing from the scope and spirit of the appended claims. For the scope of the present disclosure, the disclosure of the present disclosure is illustrative rather than restrictive, and the scope of the present disclosure is defined by the appended claims.

The invention claimed is:

1. A method for executing a data storage instruction in a processor, comprising:

splitting the data storage instruction into a first split instruction and a second split instruction, wherein the first split instruction is associated with an address operand of the data storage instruction, and the second split instruction is associated with a data operand of the data storage instruction;

executing the first split instruction to determine a data storage address corresponding to the address operand;

storing the first split instruction and the data storage address;

executing the second split instruction to acquire data content corresponding to the data operand;

merging the first split instruction and the second split instruction by correlating the acquired data content and the stored data storage address according to a correspondence between the first split instruction and the second split instruction; and storing the acquired data content to the determined data storage address in a data storage region.

2. The method of claim 1, further comprising:

storing the first split instruction and a data loading instruction in a first issue queue; and storing the second split instruction in a second issue queue different from the first issue queue;

wherein executing the first split instruction to determine the data storage address comprises:

issuing the first split instruction from the first issue queue, and wherein executing the second split instruction to acquire the data content comprises:
issuing the second split instruction from the second issue queue.

3. The method of claim 1, further comprising:
acquiring the data storage instruction and decoding the data storage instruction to determine the data operand and the address operand in the data storage instruction.

4. The method of claim 1, wherein the data content comprises any one or more of:
a register value, an operation result of an arithmetic unit, or data from the data storage region.

5. An instruction execution device in a processor, comprising:
an instruction splitting unit including circuitry configured to split a data storage instruction into a first split instruction and a second split instruction, wherein the first split instruction is associated with an address operand of the data storage instruction, and the second split instruction is associated with a data operand of the data storage instruction;
an instruction address generation unit including circuitry configured to execute the first split instruction to determine a data storage address corresponding to the address operand;
a storage instruction buffer communicatively coupled to the instruction address generation unit and configured to store the first split instruction and the determined data storage address;
a storage data acquisition unit including circuitry configured to execute the second split instruction to acquire data content corresponding to the data operand;
the storage instruction buffer is further configured to merge the first split instruction and the second split instruction by correlating the acquired data content and the stored data storage address according to a correspondence between the first split instruction and the second split instruction; and
a memory operation unit including circuitry configured to store the acquired data content to the determined data storage address in a data storage region.

6. The instruction execution device according to claim 5, further comprising:
the first storage unit is communicatively coupled to the instruction splitting unit and configured to receive and store the first split instruction for issuing and execution; and
a second storage unit communicatively coupled to the instruction splitting unit and configured to receive and store the second split instruction for issuing and execution;
wherein:
the first storage unit is communicatively coupled to the instruction address generation unit and configured to issue the first split instruction to the instruction address generation unit to determine the data storage address, and
the second storage unit is communicatively coupled to the storage data acquisition unit and configured to issue the second split instruction to the storage data acquisition unit to acquire the data content corresponding to the data operand.

7. The instruction execution device of claim 5, further comprising:
an instruction fetch unit including circuitry configured to acquire a data operation instruction including a data loading instruction and the data storage instruction; and
an instruction decoding unit including circuitry configured to:
decode the acquired data operation instruction to determine the data storage instruction in the data operation instruction;
determine the data operand and the address operand in the data storage instruction; and
send the data storage instruction to the instruction splitting unit.

8. The instruction execution device of claim 5, wherein the storage data acquisition unit is further configured to acquire the data content via the memory operation unit.

9. The instruction execution device of claim 5, further comprising an arithmetic unit, wherein the storage data acquisition unit is further configured to acquire an operation result from the arithmetic unit as the data content.

10. The instruction execution device of claim 5, wherein the storage data acquisition unit is further configured to acquire a register value as the data content.

11. The instruction execution device of claim 5, wherein the storage data acquisition unit is further configured to acquire the data content for one second split instruction at a time.

12. A processor, comprising: an instruction execution device comprising:
an instruction splitting unit including circuitry configured to split a data storage instruction into a first split instruction and a second split instruction, wherein the first split instruction is associated with an address operand of the data storage instruction, and the second split instruction is associated with a data operand of the data storage instruction;
an instruction address generation unit including circuitry configured to execute the first split instruction to determine a data storage address corresponding to the address operand;
a storage instruction buffer communicatively coupled to the instruction address generation unit and configured to store the first split instruction and the determined data storage address;
a storage data acquisition unit including circuitry configured to execute the second split instruction to acquire data content corresponding to the data operand;
the storage instruction buffer is further configured to merge the first split instruction and the second split instruction by correlating the acquired data content and the stored data storage address according to a correspondence between the first split instruction and the second split instruction; and
a memory operation unit including circuitry configured to store the acquired data content to the determined data storage address in a data storage region.

13. The processor of claim 12, wherein the instruction execution device further comprises:
a first storage unit communicatively coupled to the instruction splitting unit and configured to receive and store the first split instruction for issuing and execution; and
a second storage unit communicatively coupled to the instruction splitting unit and configured to receive and store the second split instruction for issuing and execution;
wherein:
the first storage unit is communicatively coupled to the instruction address generation unit and configured to issue the first split instruction to the instruction address generation unit to determine the data storage address; and the second storage unit is communicatively coupled to the storage data acquisition unit and configured to issue the second split instruction to the storage data acquisition unit to acquire the data content corresponding to the data operand.

14. The processor of claim 12, wherein the instruction execution device further comprises:

an instruction fetch unit including circuitry configured to acquire a data operation instruction including a data loading instruction and the data storage instruction; and an instruction decoding unit including circuitry configured to:

decode the acquired data operation instruction to determine the data storage instruction in the data operation instruction;

determine the data operand and the address operand in the data storage instruction; and send the data storage instruction to the instruction splitting unit.

15. The processor of claim 12, wherein the storage data acquisition unit is further configured to acquire the data content from at least one of: the data storage region via the memory operation unit, an operation result from an arithmetic unit, or a register value, and wherein the storage data acquisition unit is further configured to acquire the data content for one second split instruction at a time.

16. The processor of claim 12, further comprising a processor resource communicatively coupled to the instruction execution device, the processor resource including a register or a cache.

17. A processor, comprising:

an instruction fetch unit including circuitry configured to acquire an instruction to be executed;

an instruction decoding unit including circuitry configured to decode the acquired instruction to determine a type and an operand of the instruction, the instruction comprising a data loading instruction of the type of data loading and a data storage instruction of the type of data storage;

an instruction splitting unit including circuitry configured to split the data storage instruction into a first split instruction and a second split instruction, wherein the first split instruction is associated with an address operand of the data storage instruction, and the second split instruction is associated with a data operand of the data storage instruction;

an instruction issue unit including circuitry configured to store the decoded instruction for issuing and execution, wherein the instruction issue unit comprises:

a first storage unit communicatively coupled to the instruction decoding unit and the instruction splitting unit and configured to receive and store the decoded data loading instruction and the first split instruction for issuing and execution; and a second storage unit communicatively coupled to the instruction splitting unit and configured to receive and store the second split instruction for issuing and execution; and an instruction execution unit including circuitry configured to execute the instruction issued from the instruction issue unit, the instruction execution unit configured to execute data loading and storing operation, wherein the instruction execution unit comprises:

an instruction address generation unit including circuitry configured to receive an instruction issued by the first storage unit and execute the data loading instruction and the first split instruction to determine a data storage address corresponding to the address operand;

a storage data acquisition unit including circuitry configured to receive an instruction issued by the second storage unit and execute the second split instruction to acquire data content corresponding to the data operand;

a storage instruction buffer communicatively coupled to the instruction address generation unit and configured to store the first split instruction and the determined data storage address, wherein the storage instruction buffer is configured to, after the storage data acquisition unit acquires the data content, merge the first split instruction and the second split instruction by correlating the acquired data content and the stored data storage address according to a correspondence between the first split instruction and the second split instruction; and a memory operation unit including circuitry configured to store the acquired data content to the determined data storage address in a data storage region.

18. A system on chip, comprising:

a processor including an instruction execution device comprising:

an instruction splitting unit including circuitry configured to split a data storage instruction into a first split instruction and a second split instruction, wherein the first split instruction is associated with an address operand of the data storage instruction, and the second split instruction is associated with a data operand of the data storage instruction;

an instruction address generation unit including circuitry configured to execute the first split instruction to determine a data storage address corresponding to the address operand;

a storage instruction buffer communicatively coupled to the instruction address generation unit and configured to store the first split instruction and the determined data storage address;

a storage data acquisition unit including circuitry configured to execute the second split instruction to acquire data content corresponding to the data operand;

the storage instruction buffer is further configured to merge the first split instruction and the second split instruction by correlating the acquired data content and the stored data storage address according to a correspondence between the first split instruction and the second split instruction; and a memory operation unit including circuitry configured to store the acquired data content to the determined data storage address in a data storage region.

19. The system on chip of claim 18, further comprising:

an instruction storage space communicatively coupled to the instruction execution device and configured to provide the data storage instruction to the instruction execution device; and an external storage space communicatively coupled to the instruction execution device and configured to store the acquired data content.

* * * * *